Jan. 15, 1924.  
S. H. COWIN  
1,480,670  
PHASE CONVERTING AND POWER FACTOR CONTROL MACHINE  
Filed Oct. 17, 1918
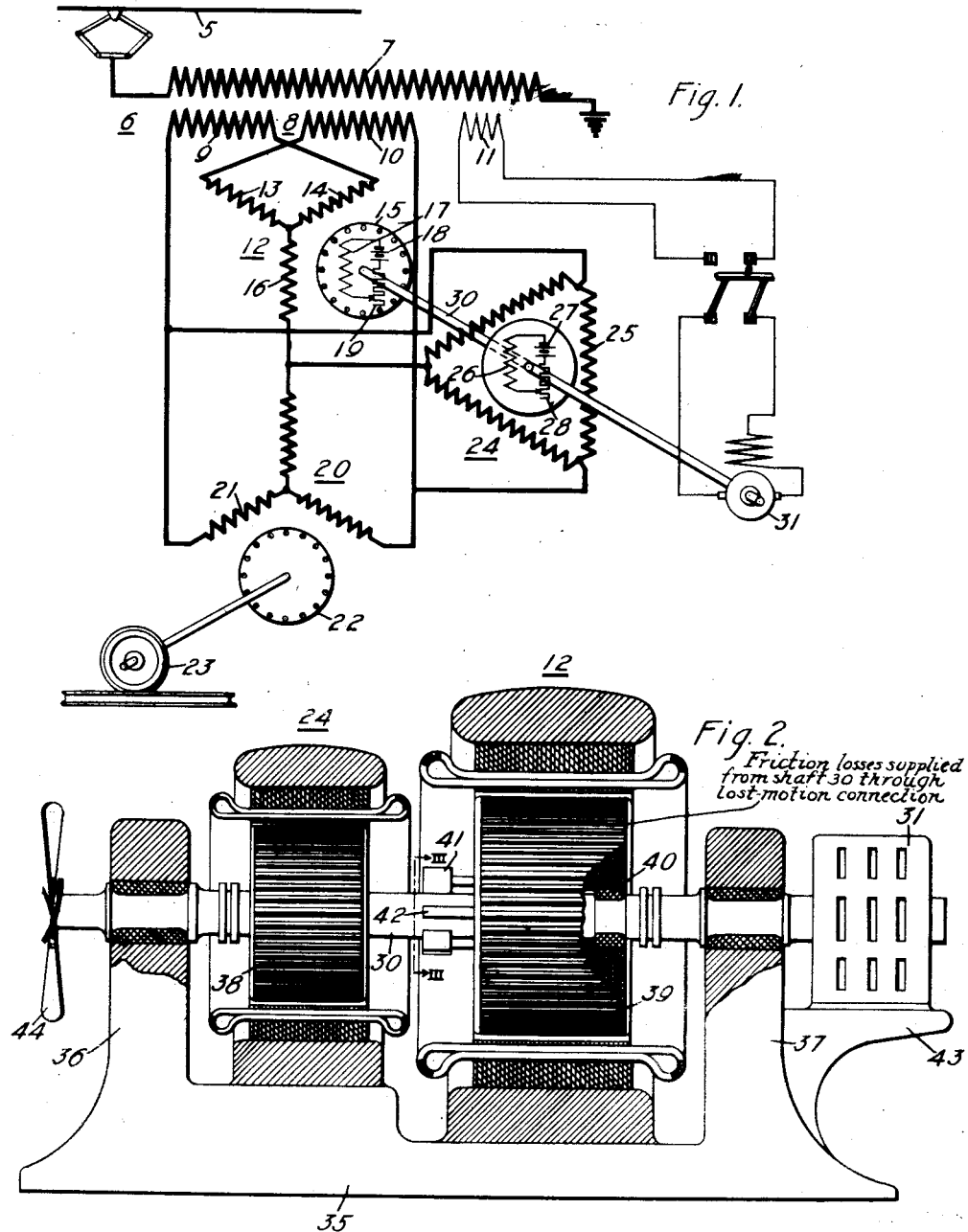
WITNESSES:  
H. J. Shelhamer  
D. C. Davis
INVENTOR  
Stuart H. Cowin  
BY  
Wesley J. Carr  
ATTORNEY Patented Jan. 15, 1924.

1,480,670

UNITED STATES PATENT OFFICE.

STUART H. COWIN, OF EDGEWOOD PARK, PENNSYLVANIA, ASSIGNOR TO WESTINGHOUSE ELECTRIC & MANUFACTURING COMPANY, A CORPORATION OF PENNSYLVANIA.

PHASE-CONVERTING AND POWER-FACTOR-CONTROL MACHINE.

Application filed October 17, 1918. Serial No. 258,581.

*To all whom it may concern:*

Be it known that I, STUART H. COWIN, a citizen of the United States, and a resident of Edgewood Park, in the county of Allegheny and State of Pennsylvania, have invented a new and useful Improvement in Phase-Converting and Power-Factor-Control Machines, of which the following is a specification.

My invention relates to phase-converting and power-factor-control apparatus to be used in connection with distributing systems, and it has for its object to provide apparatus of the character designated that shall be self-starting, that shall provide balanced-output electromotive forces at all loads, and that shall ensure ready control of the power-factor under all conditions.

In the accompanying drawing, Fig. 1 is a diagrammatic view of converting and power-factor-control apparatus, together with attendant supply, load and auxiliary circuits embodying a preferred form of my invention; Fig. 2 is a side view, partially in section and partially in elevation, of a composite machine constructed in accordance with my invention; and Fig. 3 is a detail cross-sectional view taken on the line III—III of Fig. 2.

In a copending application of Lewis W. Chubb, Serial No. 206,921, filed Dec. 13, 1917, and assigned to the Westinghouse Electric & Manufacturing Company, is shown and claimed a phase-converter system for the conversion of single-phase energy into polyphase energy by means of a dynamo-electric phase-converter. The secondary of the single-phase supply transformer is split into two portions and these portions are connected between the primary phase windings of the three-phase converter and the load circuit in such manner as to reverse the phase-sequence of the output electromotive forces of the converter, thus causing these electromotive forces to have the same phase sequence as the impedance drops within the converter. These two balanced systems thus coalesce under all load conditions and the voltages supplied by the converter to the load circuit are balanced under all load conditions.

With apparatus of the character described, it is usual to employ a converter of the synchronous type and it is necessary that the unidirectional excitation thereof have a predetermined value in order to obtain voltage balance. This requirement precludes the adjustment of the unidirectional excitation of the secondary member of the converter for the adjustment of the power-factor control of the system.

It has been proposed to float a polyphase synchronous condenser upon the polyphase side of the phase-converter and to adjust the excitation of this condenser for the power-factor control and adjustment of the entire system.

I find that the rotors of the converter and of the condenser may well be mounted upon a common shaft, so that the condenser shall be enabled to drive the converter armature, thus reducing the losses in the converting machine and the resultant unbalancing forces therein. While the two rotors both turn at synchronous speed, it is necessary that they occupy different relative angular positions under different conditions of power-factor control and, to this end, a lost-motion connection is provided in the connecting shaft so that, while both machines run at synchronous speed, the desired changes in the relative angular relationship may readily take place.

Referring to the drawings for a more detailed understanding of my invention, I show a source of single-phase alternating current, such, for example, as a trolley conductor 5 in Fig. 1. Energy from the source 5 is supplied to a transformer 6 comprising a primary winding 7 and a secondary winding 8, this secondary winding being preferably split into two equal parts 9 and 10. The transformer 6 may further be provided with an auxiliary secondary winding 11 for a purpose to be hereinafter pointed out.

A phase-converter of the dynamo-electric type is shown at 12 and comprises primary windings 13 and 14, a secondary winding 15 mounted on a rotor member, and a tertiary winding 16. The rotor member may further be provided with a unidirectional or polarized exciting winding 17 for synchronous operation, this winding being energized from a direct-current source 18 through current-adjusting means 19.

A polyphase load is represented by a polyphase induction motor 20, embodying a primary winding 21 and a secondary winding 22, the latter being shown as mounted on the rotor and connected to a driving wheel 23.

The primary windings 13 and 14 of the converter 12 are connected, through the transformer secondary windings 9 and 10, to two terminals of the primary winding 21, and the tertiary winding 16 is connected directly to the remaining terminal of said primary winding.

By the specific connections thus set forth, the output electromotive forces of the converter 12 are reversed in phase-sequence by the electromotive forces of the windings 9 and 10 and thus have the same phase sequence as the impedance drops within the converter 12, so that the output voltages of the converter are, at all times, balanced, assuming proper excitation of the winding 17, all as fully set forth in the aforementioned Chubb application.

For the power-factor control of the system, I show a synchronous condenser at 24 comprising an armature winding 25 connected across the polyphase mains and an exciting winding 26 connected to be energized from a direct-current source 27 through a current-adjusting device 28. By adjustment of the latter element, the power-factor-controlling function of the machine 24 may be adjusted in any desired manner.

The machines 12 and 24 are shown mounted on a common shaft 30 and, if desired, a starting motor 31 of the series-commutating type may be placed upon this shaft and connected to be energized from the secondary winding 11.

In operation, the motor 31 is first started and operated to bring the two synchronous machines to synchronous speed, when they lock into synchronism and the starting motor 31 may be de-energized.

Turning now to the mechanical construction of the composite set thus described, attention is directed to Figs. 2 and 3. The machines 12 and 24 are shown mounted on a common bedplate 35 provided with two pedestal bearings 36 and 37. The rotors 38 and 39 of the two machines are mounted on the common shaft 30, the rotor 38 being keyed rigidly thereto and the rotor 39 being free to turn thereupon, as through bearings 40. The degree of angular movement of the rotor 39 upon the shaft 40 is restricted, however, because of radial lugs 41 projecting from the shaft 30 so as to loosely embrace pins 42 extending longitudinally from the rotor 39, all as shown in Fig. 3.

The starting motor 31 may be mounted upon a bracket 43 and, if desired, a ventilating fan 44 may be mounted on the other end of the shaft 30.

As previously stated, a lost-motion connection is provided between the rotor 39 and the shaft 12. The shaft 30 is driven at synchronous speed by the rotor 38 of the synchronous motor, this rotor supplying the friction and windage losses of the entire set. It is thus seen that the rotors of the two machines are free to occupy different relative angular positions under different conditions of power factor control, while at the same time the condenser is enabled at all times to drive the converter armature, thus reducing the losses in the converting machine and the resulting unbalancing forces therein.

With different degrees of power-factor correction, the angular position of the rotor 38, with respect to its true synchronous position, shifts but this change does not change the angular position of the rotor 39 with respect to its true synchronous position as the necessary relative adjustment takes place at the bearings 40—40.

While I have shown my invention in a preferred form, it is not so limited but is susceptible of various minor changes and modifications without departing from the spirit thereof and I desire, therefore, that only such limitations shall be placed thereupon as are imposed by the prior art or as are specifically set forth in the appended claims.

I claim as my invention:

1. The combination with a phase-converter of the dynamo-electric type, of a synchronous condenser, and a lost-motion means for supplying a torque to the rotor of said converter from the rotor of said condenser while at the same time permitting changes in the relative angular relationship of the two rotors.

2. The combination with a phase-converter of the synchronous dynamo-electric type, of a synchronous condenser, and a lost-motion means for supplying a torque to the rotor of said converter from the rotor of said condenser while at the same time permitting changes in the relative angular relationship of the two rotors.

3. The combination with a source of single-phase alternating current, of a polyphase load circuit, a phase-converter of the dynamo-electric type connected between said source and said circuit and adapted to transfer energy therebetween, a synchronous condenser connected to float on the polyphase side of said converter, and a lost-motion means for supplying a torque to the rotor of said converter from the rotor of said condenser while at the same time permitting changes in the relative angular relationship of the two rotors.

4. The combination with a source of single-phase alternating current, of a polyphase load circuit, a phase-converter of the synchronous dynamo-electric type connected between said source and said circuit and adapted to transfer energy therebetween, a synchronous condenser connected to float on the polyphase side of said converter and a lost-motion connection between the rotor members of said converter and of said condenser.

5. The combination with a source of single-phase alternating current, of a transformer having its primary winding connected thereto and having its secondary winding divided into two portions, a phase-converter of the three-phase dynamo-electric type and a three-phase load circuit, connections from two-phase divisions of said converter through said transformer-secondary divisions, respectively, to two terminals of said load circuit, and a connection from the remaining phase-division of said converter to the remaining terminal of said load circuit, whereby energy may be interchanged between said source and said load circuit and the secondary electromotive forces of said transformer may serve to reverse the phase-sequence of the output electro-motive forces of said phase-converter, whereby the output electromotive forces thereof shall have the same phase-sequence as the impedance drops therein and balanced terminal voltages shall be produced under all load conditions, a synchronous condenser floating on the polyphase side of said converter for the control of the power-factor of said system and a lost-motion connection between the rotors of said converter and said condenser, whereby the rotor of said converter is driven by said condenser but said two rotors are free to adjust their relative angular positions.

6. The combination with a dynamo-electric phase balancer, of a synchronous motor, and a lost motion means for supplying a torque to the rotor of said balancer from the rotor of said motor while at the same time permitting changes in the relative angular relationship of the two rotors.

7. The combination with a single-phase system and a polyphase system, of means for subdividing the voltage of said single-phase system into a plurality of portions, a phase converter of the polyphase synchronous dynamo-electric type having its phases connected across the respective phases of said polyphase system, means for connecting one or more portions of said single-phase system in series with the respective phases of said converter in each phase of said polyphase system, a synchronous condenser connected to float on the polyphase system, and means for supplying a torque to the rotor of said converter from the rotor of said condenser while at the same time permitting changes in the relative angular relationship of the two rotors.

8. The combination with a polyphase series phase converter, of a polyphase translating device serially connected thereto and carrying currents of other than unity power factor, a synchronous condenser connected in parallel with said translating device, and means for supplying a torque to the rotor of said converter from the rotor of said condenser while at the same time permitting changes in the relative angular relationship of the two rotors.

9. The combination with a single-phase system and a polyphase system, of a polyphase synchronous shunt machine, a polyphase series phase-converter machine, means for connecting said series machine directly in series between said single-phase system and said polyphase system, means for connecting said shunt machine as a synchronous condenser on the polyphase line, and means for supplying a torque to the rotor of said converter from the rotor of said condenser while at the same time permitting changes in the relative angular relationship of the two rotors.

10. The combination with a single-phase system, of a polyphase system having voltages displaced substantially 120° in phase, a transformer associated with said single-phase system, a polyphase series converter machine connected in series between the terminals of said polyphase system and a plurality of winding portions of said single-phase transformer, a polyphase synchronous shunt machine, means for connecting said shunt machine as a synchronous condenser on the polyphase line, and means for supplying a torque to the rotor of said converter from the rotor of said condenser while at the same time permitting changes in the relative angular relationship of the two rotors.

In testimony whereof, I have hereunto subscribed my name this 26th day of Sept., 1918.

STUART H. COWIN.